United States Patent [19]
Ashley et al.

[11] Patent Number: 6,134,232
[45] Date of Patent: Oct. 17, 2000

[54] METHOD AND APPARATUS FOR PROVIDING A MULTI-PARTY SPEECH CONNECTION FOR USE IN A WIRELESS COMMUNICATION SYSTEM

[75] Inventors: James Patrick Ashley, Naperville; Lee Michael Proctor, Cary, both of Ill.

[73] Assignee: Motorola, Inc., Schaumburg, Ill.

[21] Appl. No.: 08/885,234

[22] Filed: Jun. 30, 1997

Related U.S. Application Data

[63] Continuation of application No. 08/622,975, Mar. 27, 1996, abandoned.

[51] Int. Cl.[7] ........................................ H04J 3/22
[52] U.S. Cl. ............................. 370/349; 370/468
[58] Field of Search .................... 370/276, 277, 370/285, 465, 468, 493, 494, 495, 527, 528, 529, 532, 537, 538, 540, 328, 336, 345, 349, 433; 704/200, 258, 500, 501, 503, 504

[56] References Cited

U.S. PATENT DOCUMENTS

| | | | |
|---|---|---|---|
| 4,301,531 | 11/1981 | Lubin | 370/62 |
| 4,388,717 | 6/1983 | Burke | 370/62 |
| 4,475,190 | 10/1984 | Marouf et al. | 370/62 |
| 4,479,211 | 10/1984 | Bass et al. | 370/62 |
| 4,482,998 | 11/1984 | Marcouf et al. | 370/62 |
| 4,716,585 | 12/1987 | Tompkins et al. | 379/202 |
| 4,766,606 | 8/1988 | Bardutz et al. | 379/344 |
| 4,809,261 | 2/1989 | Ratcliff | 370/59 |
| 4,858,227 | 8/1989 | Ratcliff | 370/59 |
| 5,115,469 | 5/1992 | Taniguchi et al. | 704/228 |
| 5,148,429 | 9/1992 | Kudo et al. | 370/9.42 |
| 5,224,094 | 6/1993 | Maher | 370/62 |
| 5,390,177 | 2/1995 | Nahumi | 370/62 |
| 5,414,796 | 5/1995 | Jacobs et al. | 704/221 |
| 5,511,073 | 4/1996 | Padovani et al. | 370/471 |
| 5,546,395 | 8/1996 | Sharma et al. | 370/468 |
| 5,881,053 | 3/1999 | Kimball | 370/260 |
| 5,911,128 | 6/1999 | DeJaco | 704/221 |

*Primary Examiner*—Chi H. Pham
*Assistant Examiner*—Kwang B. Yao
*Attorney, Agent, or Firm*—Heather L. Creps

[57] ABSTRACT

An apparatus (200) for providing a multi-party speech connection for use in a wireless communication system (10). The apparatus (200) comprises a first speech encoder (202) producing a first encoded speech signal, a second speech encoder (20) producing a second encoded speech signal, a conference circuit (22), and a speech decoder (208) responsive to the conference circuit (22). The conference circuit (22) receives the first and second speech encoded signals and produces a multiplexed encoded speech signal. The speech decoder (208) receives the multiplexed encoded speech signal and produces a decoded speech signal.

7 Claims, 4 Drawing Sheets

METHOD AND APPARATUS FOR PROVIDING A MULTI-PARTY SPEECH CONNECTION FOR USE IN A WIRELESS COMMUNICATION SYSTEM

This is a continuation of application Ser. No. 08/622,975, filed Mar. 27, 1996 and now abandoned.

FIELD OF THE INVENTION

The present invention relates generally to multiplexed communications, and more particularly to multi-party speech connections for use in a wireless communication system.

BACKGROUND OF THE INVENTION

In a variable rate digital communication system, such as the Electronics Industry Association (EIA)/Telecommunication Industry Association (TIA) interim specification (IS) IS-95 code division multiple access (CDMA) cellular system, a conventional conference circuit can suffer severe voice quality degradation when two or more of the parties are mobile subscriber units. Such degradation may be caused by an additional transcoding operation, and associated delay, performed when a third communication channel is bridged to two mobile communication links. In addition, line echo cancellation performed at a transcoder can lead to further degradation in speech quality.

Accordingly, there exists a need for an apparatus and method for providing a multiparty call in a wireless commuinication system.

SUMMARY OF THE INVENTION

In order to address this need as well as others, the present invention provides an apparatus and a method for providing a multi-party speech connection for use in a wireless communication system. The apparatus comprises a first speech encoder producing a first encoded speech signal, a second speech encoder producing a second encoded speech signal, a conference circuit, and a speech decoder responsive to the conference circuit. The conference circuit receives the first and second speech encoded signals and produces a multiplexed encoded speech signal. The speech decoder receives the multiplexed encoded speech signal and produces a decoded speech signal.

The method of selecting an encoded speech signal comprises the steps of receiving a first plurality of frames from a plurality of encoded speech signals, selecting one of the frames of the first plurality of frames as a primary frame based on the rate of each of the encoded speech signals, starting a timer after detecting voice inactivity on the encoded speech signal associated with the primary frame, comparing the timer with a threshold, and selecting one of the frames as an output frame based on the comparison.

According to another aspect of the invention, a statistical encoded voice multiplexer is provided. The statistical encoded voice multiplexer comprises a multiplexer having a plurality of encoded speech inputs and a control input, and a state processor coupled to the multiplexer. The state processor receives transmission rate data associated with signals received at the encoded speech inputs and produces a state processor output coupled to the control input. The multiplexer outputs an encoded speech output based on at least one of the plurality of encoded speech inputs and based on the control input.

The invention itself, together with its attendant advantages, will best be understood by reference to the following detailed description, taken in conjunction with the accompanying drawings.

DETAILED DESCRIPTION OF THE PREFERRED EMBODIMENT(S)

Figure 1:
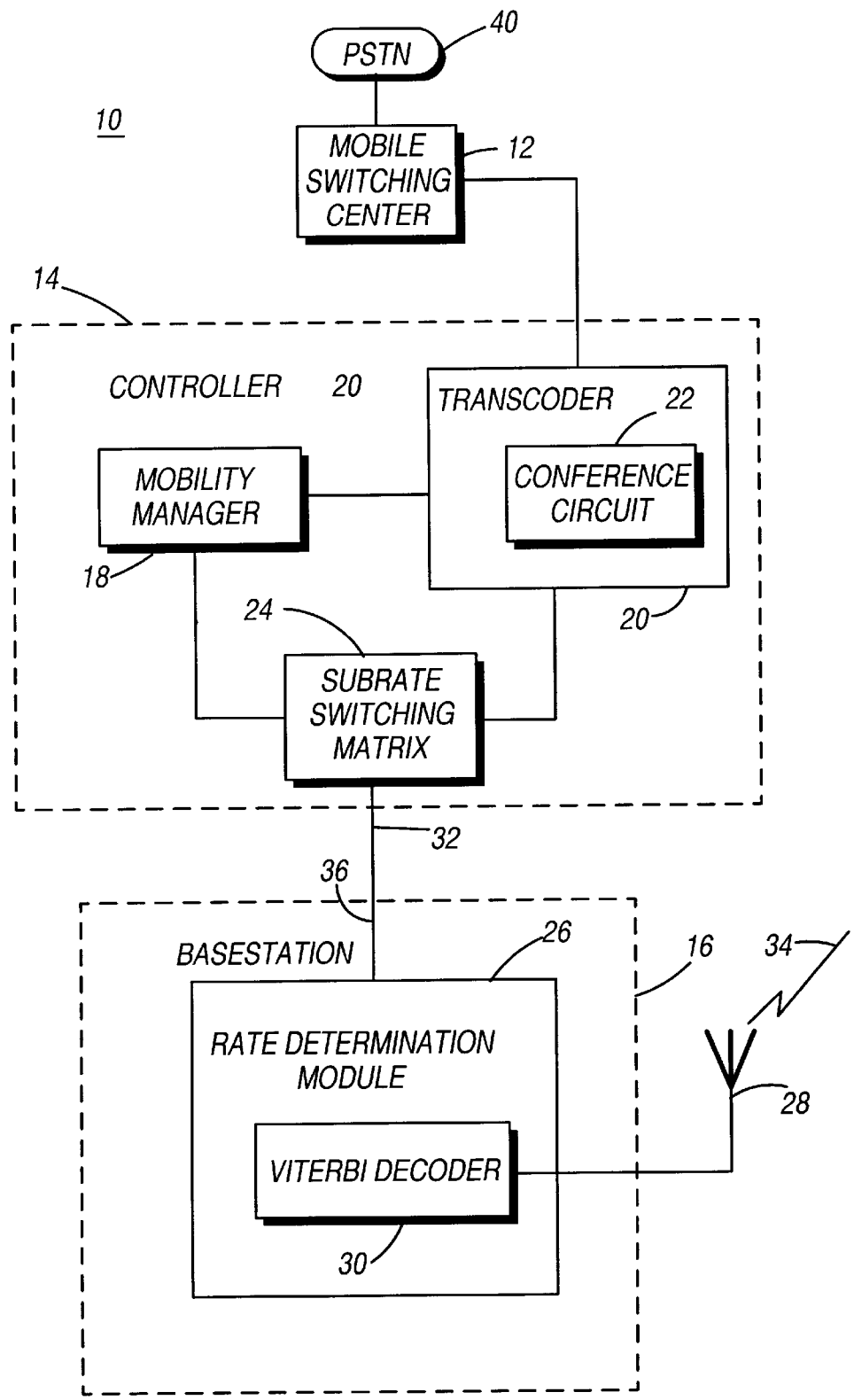
FIG. 1 is a block diagram of a preferred embodiment of a wireless communication system.

Referring to FIG. 1, a preferred embodiment of a wireless communication system 10 is illustrated. The wireless communication system 10 includes a mobile switching center 12, a controller 14, a base station 16 and a public switch telephone network (PSTN) 40. The controller 14 is coupled to the mobile switching center 12 and the base station 16. The controller 14 includes a mobility manager 18, a transcoder 20, and a subrate switch matrix 24. The transcoder 20 includes a conference circuit 22, such as a three party conference circuit. The base station 16 includes a rate determination module 26 including a decoder 30, such as a Viterbi decoder. The base station 16 also includes an antenna 28 which receives a radio frequency signal 34. The base station 16 communicates with the controller 14 via an interface 32, such as a conventional packet-based base station to base station controller interface well known to those of ordinary skill in the art.

During operation, the antenna 28 receives the radio frequency signal 34 and passes the received signal to the decoder 30. In the preferred embodiment the received signal 34 is an encoded speech signal that preferably has been formatted with an error correction protocol, such as a signal formatted in accordance with Telecommunication Industry Association (TIA) Interim Specifications (IS) IS-95. The Viterbi decoder 30 decodes the received signals in a manner that is well known to those of skill in the art. The rate determination module 26 estimates the transmission rate of packets within the received signal 34 and outputs a signal 36 containing both encoded speech packets and rate information. The output signal 36 containing encoded speech packets and rate information is then transmitted by the base station 16 over the interface 32 to the controller 14. The encoded speech packets and the rate information is received at the subrate switch matrix 24 and passed to the conference circuit 22 via transcoder 20. Although only one base station is illustrated in FIG. 1, it is contemplated that controller 14 preferably interfaces to a plurality of base stations 16. In the case where a plurality of base stations are connected to controller 14, the conference circuit 22 receives a plurality of encoded speech packets and corresponding rate information from each of these base stations. In this application the conference circuit multiplexes a plurality of received encoded speech packets with corresponding rate information and then outputs an encoded speech packet. It is also to be understood that the conference circuit 22 is responsive to the mobile switching center 12 and the PSTN 40. For example, the conference circuit 22 may conference a signal received from the PSTN via the mobile switching center 12 with a signal received from base station 16, such as the output signal 36 with encoded speech packets and corresponding rate information, received over interface 32.

Figure 2:
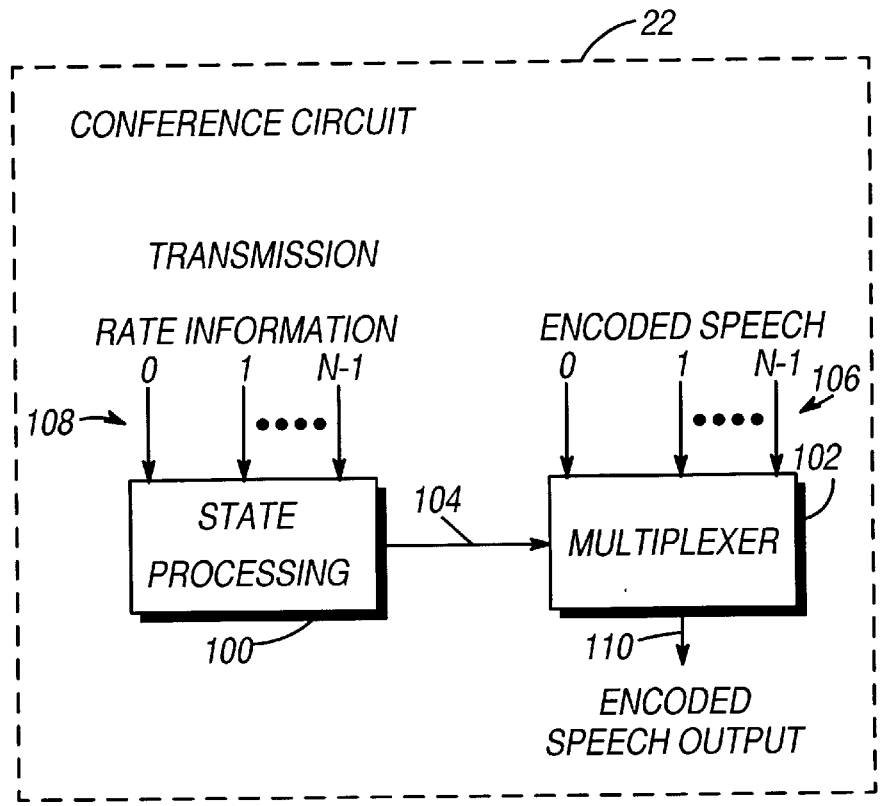
FIG. 2 is a block diagram of the conference circuit of FIG. 1.

Referring to FIG. 2, a preferred embodiment of the conference circuit 22 is illustrated. The conference circuit is preferably a statistical encoded voice multiplexer. The conference circuit 22 includes a state processing unit 100 and a multiplexer 102. The state processing module 100 is coupled to the multiplexer 102 via a control line 104. The state processing module 100 receives transmission rate information 108, and the multiplexer 102 receives encoded speech input information 106. The transmission rate information 108 may correspond to the rate information generated by the rate determination module 26. Similarly, the encoded speech information 106 may correspond to or may be derived from encoded speech packets that were decoded by the Viterbi decoder 30 and transmitted over the interface 32. The encoded speech information may in a particular embodiment include coded parameters derived from the encoded speech packets, such as frame energy parameters or prediction gain parameters.

The multiplexer 102 in response to the state processing unit 100 selects at least one of the encoded speech inputs 106 and produces an encoded speech output 110. The encoded speech inputs 106 have been labeled from zero to N−1, and each input represents a separate encoded speech channel, such as from a separate mobile communication unit (not shown) in communication with a base station 16. Similarly the rate information input 108 has been labeled zero to N−1 for rate information associated with each of the encoded speech signals 106. The encoded speech ouput 110 includes up to M output signals, where M is preferably less than N.

Figure 3:
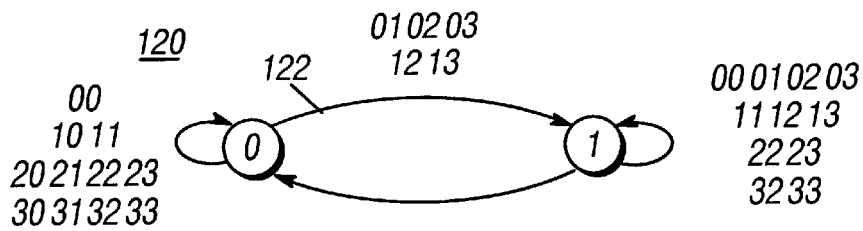
FIG. 3 is a state transition diagram of the state processing unit of FIG. 2.
Figure 3:

A state transition diagram illustrating a method of control within the state processing unit 100 is disclosed in FIG. 3. The state transition diagram 120 illustrates a method of controlling a state processing unit 100 for the case where there are two received signals, that is N=2. In this case the two possible inputs have been labeled as state zero and state one respectively. A state transition from one state to the other state, such as from state zero to state one or from state one to state zero, has been illustrated via an arrow between the states. For example, if the state processing module 100 is currently in state zero the module 100 will transition to state one when any of the conditions, above transition arrow 122, are met.

For example, where the first input signals 106 has a transmission rate 108 of eighth rate and the second input signal has a transmission rate of either quarter rate, half rate, or full rate then a transition occurs between state zero and state one. In addition where the input signal corresponding to state zero has a transmission rate of quarter rate and the input signal corresponding to state one has a transmission rate of either half rate or full rate a state change from state zero to state one also occurs. It is contemplated that a computer program may be easily derived from the state transition diagrammed of FIG. 3 and loaded onto a processor to form the state processing unit 100. However, the state processing unit 100 may alternatively be implemented in electronic hardware, such as in a hard wired logic circuit.

Figure 4:
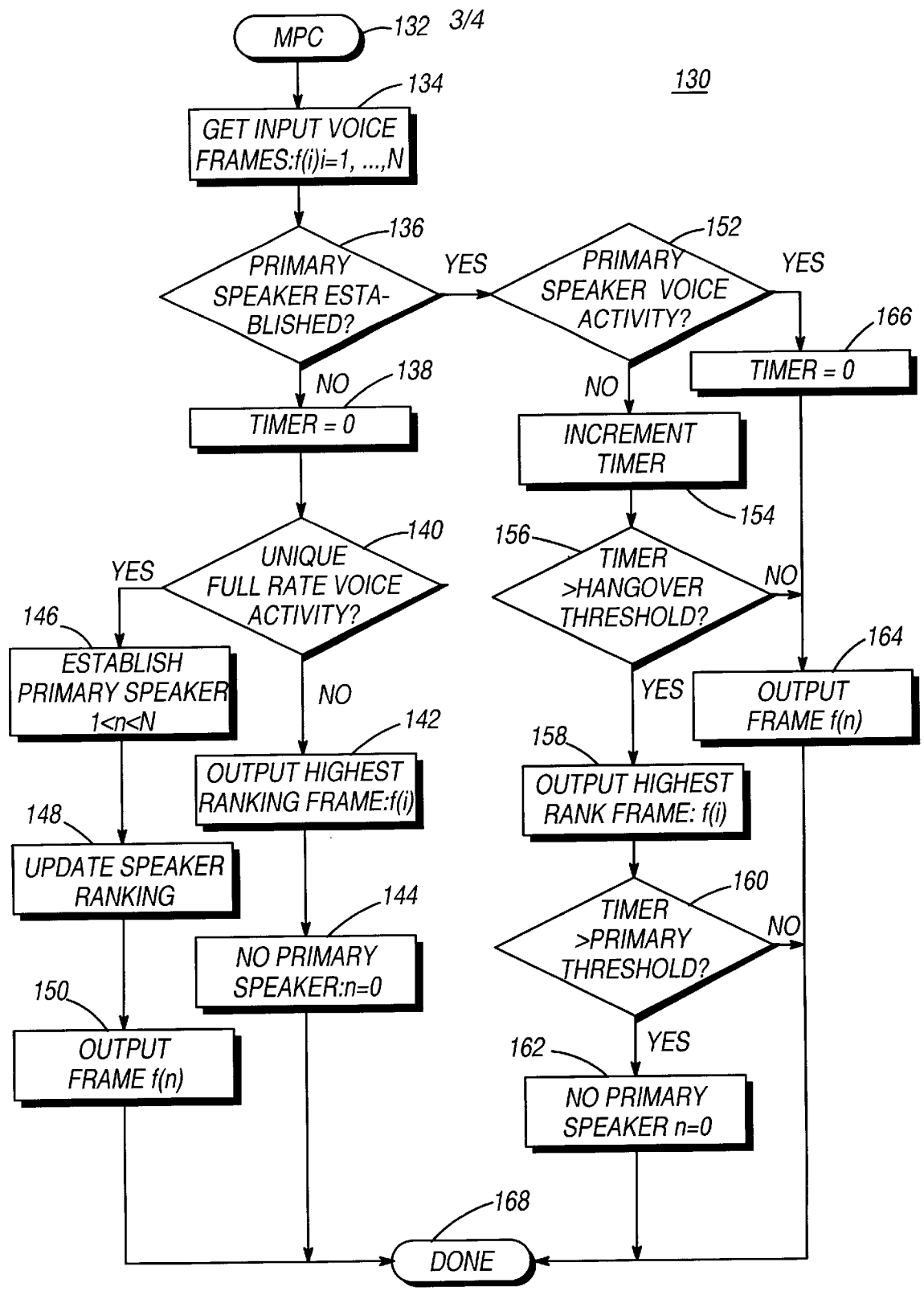
FIG. 4 is a flow chart of a method of operation performed by the state processing unit of FIG. 2.

Referring to FIG. 4, another method of operation within the state processing unit 100 is illustrated. The method begins at step 132 and continues at step 134 where voice frames associated with encoded speech signals are inputted. Next, at step 136, it is determined whether a primary speaker has been established. If no primary speaker has been established, processing continues, at step 138, where a timer is initialized and continues, at decision step 140, where it is determined whether there is unique full rate voice activity. Unique full rate voice activity occurs when one of the inputs is operating at full transmission rate and none of the other inputs is operating at the full rate. Where unique full rate voice activity is detected a primary speaker is established, at step 146. The primary speaker is the speaker communicating over the communication channel associated with the full rate activity. Next, at step 148, each of the speakers is ranked based on the transmission rate of the respective speaker channel, and an output frame is sent, at step 150. Processing is then completed at step 168. Returning to decision step 140, if there is no unique full rate activity, processing transitions to step 142 where the highest speech frame based on the rate information is output and a flag indicating there is no primary speaker is set, at step 144.

Returning to decision step 136, where a primary speaker has previously been established, processing continues at decision step 152 where it is determined whether there is voice activity on the channel of the primary speaker. If so, then a timer is set to zero at step 166, frames associated with the primary speaker and the voice activity are output at step 164, and processing is completed at 168. Alternatively, where there is no primary speaker activity, at decision step 152, a timer is incremented at 154 and then compared to a hangover threshold, at decision step 156. Where the timer exceeds the hangover threshold each of the inputs to the multiplexer 102 are rank ordered based on rate information and the frame with the highest rate is then output. Next, at decision step 160, the timer is compared to a primary threshold. If the timer exceeds the primary threshold then a flag is set, at step 162, indicating that there is no primary speaker and processing is completed at 168. Returning to decision step 156, where the timer does not exceed the hangover threshold, the current frame is output, at step 164, and processing is completed at 168.

Figure 5:
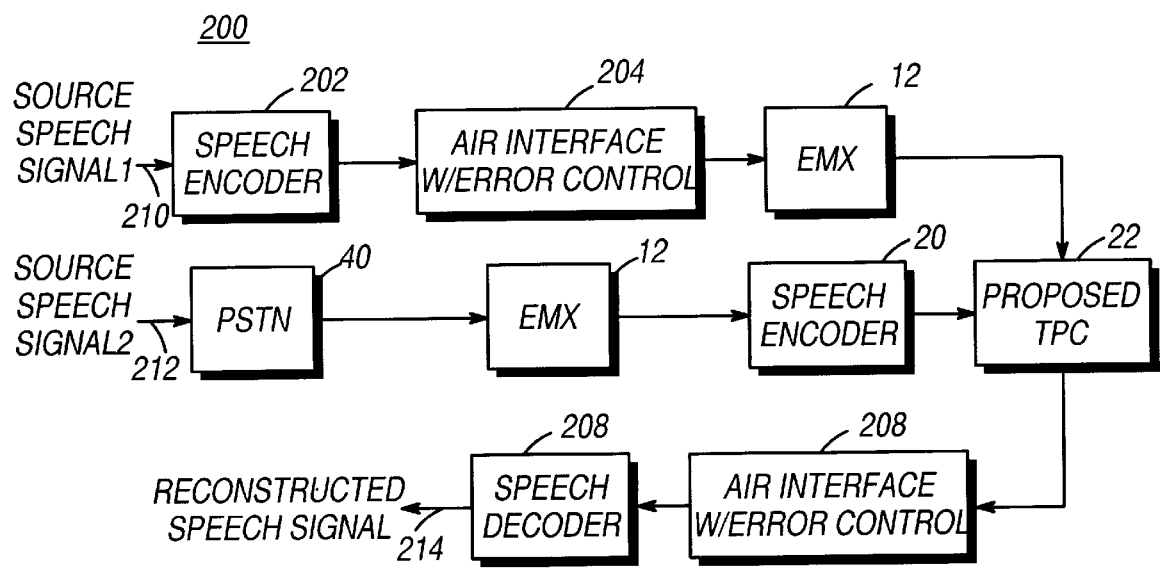
FIG. 5 is a block diagram of a particular configuration of the system of FIG. 1.

Referring to FIG. 5, a preferred embodiment of a wireless system providing a three party communication between mobile stations and a landline phone connection is illustrated. A speech signal 210 is encoded by a speech encoder 202 and transmitted via air interface 204 to a switching center 12, such as a Motorola EMX2500 Mobile Switch. The encoded signal from the switching center 12 is received at the conference circuit 22, such as a three party conference circuit described above. A second speech signal 212 received at the PSTN 40 and transmitted by switching center 12 to a speech encoder 20 is passed in encoded form to the conference circuit 22. The conference circuit 22 outputs a single encoded speech signal and transmits this signal via air interface 208. The transmitted encoded speech signal is typically received within a mobile station and decoded by speech decoder 208 and then transmitted as a reconstructed speech signal 214. The configuration 200 illustrates operation of the wireless communication system 10 using the conference circuit 22 according to a preferred embodiment of the present invention. In this particular arrangement, two mobile station subscriber's have a three party conference connection with a user of the public telephone network.

In such a configuration as well as many other configurations, the conference circuit 22 when configured according to the preferred embodiment has several benefits. For example, the conference circuit 22 improves voice quality by reducing echo distortion as well as by reducing distortion caused from conventional dual encoding techniques. In addition, since the conference circuit 22 is used instead of a bypass circuit, audio holes due to switching from such a bypass circuit to the conference circuit 22 is eliminated. Further, the preferred embodiment advantageously reduces the number of signal compressions and expansions, such as mu-law or A-law conversions, yielding higher voice quality. For example, the number of compressions and expansions is reduced since the conference circuit 22 multiplexes encoded data and thereby reduces the need for expansion of compressed data prior to the conference circuit 22. Thus, the preferred embodiment reduces degradation that may be caused by a transcoding operation, such as a transcoding operation performed when a communication channel is bridged onto a pre-existing two-party mobile communication link.

Further advantages and modifications of the above described apparatus and method will readily occur to those skilled in the art. The invention, in its broader aspects, is therefore not limited to the specific details, representative apparatus, and illustrative examples shown and described above. Various modifications and variations can be made to the above specification without departing from the scope or spirit of the present invention, and it is intended that the present invention cover all such modifications and variations provided they come within the scope of the following claims and their equivalents.

What is claimed is:

1. A method of selecting an encoded speech signal comprising the steps of:

receiving a first plurality of frames from a plurality of encoded speech signals;

selecting one of the first plurality of frames as a primary frame based on a rate of each of the encoded speech signals;

starting a timer after detecting substantial voice inactivity on the encoded speech signal associated with the primary frame;

comparing an output of said timer with a predetermined timer threshold to generate a timer comparison; and selecting one of the first plurality of frames as an output frame in response to the timer comparison.

2. The method of claim 1, further comprising the step of prioritizing each of the frames of the first plurality of frames based on the rate of each of the encoded speech signals.

3. The method of claim 1, further comprising the step of receiving a second plurality of frames from the plurality of encoded speech signals.

4. The method of claim 3, further comprising the step of prioritizing each of the frames of the second plurality of frames.

5. The method of claim 1, where in the step of selecting one of the frames of the first plurality of frames as a primary frame is further based on a coded parameter derived from at least one of the encoded signals.

6. The method of claim 5, wherein the coded parameter comprises a frame energy parameter.

7. The method of claim 5, wherein the coded parameter comprises a prediction gain parameter.

\* \* \* \* \*